F. BECK.
MACHINE FOR SAWING METALS, OPERATING AUTOMATICALLY.
APPLICATION FILED JULY 15, 1918.

1,354,874.

Patented Oct. 5, 1920.
3 SHEETS—SHEET 1.

Inventor
F. Beck
by
W. E. Evans:
Attorney.

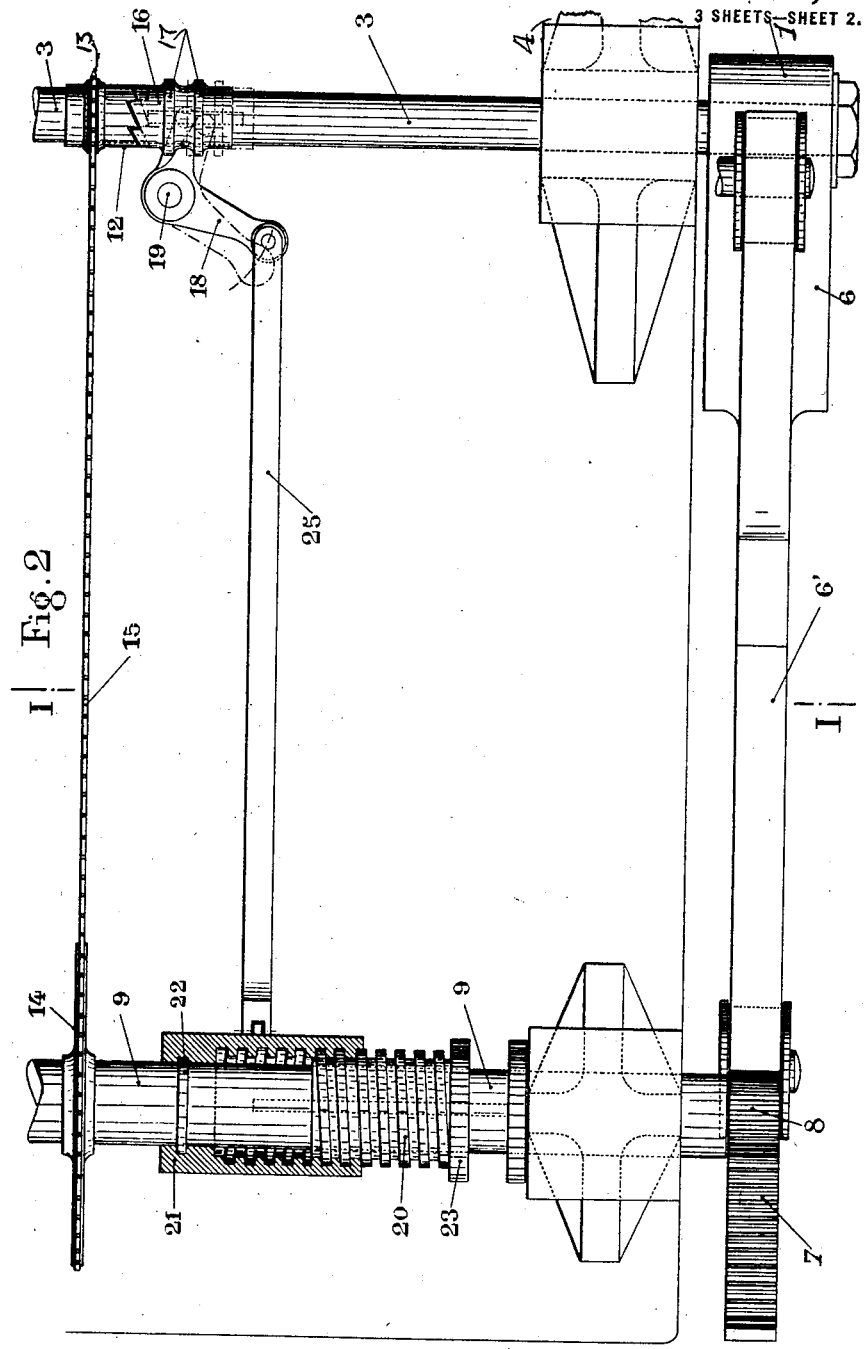

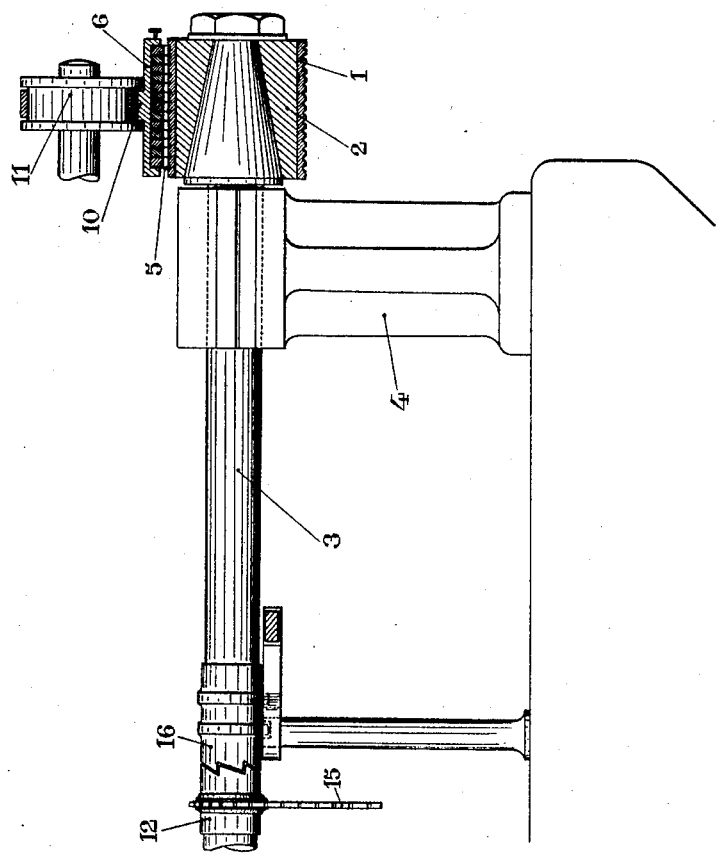

UNITED STATES PATENT OFFICE.

FRÉDÉRIC BECK, OF NEUILLY-SUR-SEINE, FRANCE.

MACHINE FOR SAWING METALS, OPERATING AUTOMATICALLY.

1,354,874.  Specification of Letters Patent.  Patented Oct. 5, 1920.

Application filed July 15, 1918. Serial No. 245,041.

*To all whom it may concern:*

Be it known that I, FRÉDÉRIC BECK, a citizen of the French Republic, residing at 46 Rue Ybry, Neuilly-sur-Seine, France, have invented a certain new and useful Machine for Sawing Metals, Operating Automatically, of which the following is a specification.

The present invention relates to a machine operating automatically for sawing metals and is more especially conceived for the purpose of simultaneously sawing a number of similar pieces of circular section, this machine being especially applicable to the sawing of motor segments.

In this machine, the piece to be sawed is given a movement of continuous rotation while the saws are displaced in an alternate rectilinear movement. During the operating stroke of the saws the direction of displacement of the tool is reverse to that of the piece to be sawed. At the end of the stroke the saws cease to be drawn mechanically and are rendered free by a suitable mechanism. The piece sawed continuing to turn in the same direction draws the saws in an opposite direction to the useful stroke and returns them to their starting point. The saws are operated afresh at this moment and commence a new useful stroke and so on.

The machine is essentially characterized by the combination with a saws carrier of an operating mechanism imparting to the said saws carrier a rectilinear movement of displacement in order to cause it to effect the working stroke, of an arrangement provided in such manner as to produce at the end of each stroke of the saws carrier either the operation of the saws carrier (the working stroke) or the liberation of the said saws carrier for permitting their rapid return under the action of the sawed piece as has been explained above. The machine is moreover characterized by various arrangements of detail and by the general disposition of elements which will be hereinafter described.

The accompanying drawings show by way of example a mode of execution of the machine forming the object of the invention.

Fig. 2 is a plan view,

Fig. 3 is a section on I I of Fig. 2.

Figure 1:
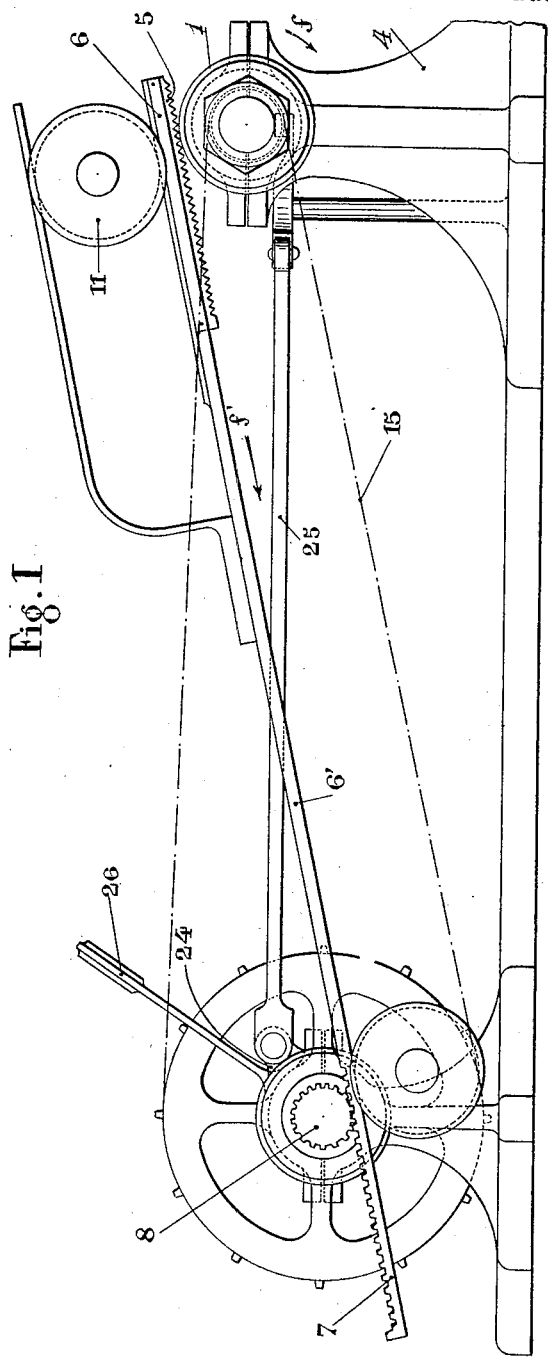
Figure 1 is a view in front elevation.

In this mode of execution the machine is more especially provided for the sawing of segments. The cast tube of steel 1 is mounted upon an extensible mandrel 2 upon which it is solidly fixed in a known manner. The mandrel 2 is itself fixed upon a spindle 3 turning in the brackets 4 conveniently disposed and carrying at its other extremity the driving pulley by which the movement is transmitted to the machine. Under the action of the drive the spindle 3 is subject to a continuous rotary movement in the direction of the arrow $f$ (Fig. 1). In this movement the spindle 3 draws the piece 1 to be sawed.

The machine being built for this purpose for sawing simultaneously a certain number of segments, it comprises a certain number of saws 5. These saws are fixed in a saws carrier 6 constituted for example as in the mode of execution illustrated, by an edged plate under which are pressed the saws by means of screws conveniently disposed, metal strips forming thick wedges being placed between two neighboring saws for maintaining them at the distance apart necessary for the work to be done. The saws carrier 6 is prolonged toward the rear by a bar 6' at the extremity of which is cut a rack 7. This rack engages with a pinion 8 fixed upon the spindle 9 parallel to the spindle 3.

It will be readily understood that the piece 1 turning in the direction of the arrow $f$, the saws carrier being operated (by the pinion and the rack) in such manner as to be displaced in the direction of the arrow $f'$ and the saws being conveniently pressed upon the work piece, this latter is sawed during the stroke of the saws in the direction of the arrow $f'$. On the other hand if at the end of this stroke the saws carrier ceases to be driven and becomes entirely free the adherence between the sawed piece and the saws is sufficient for leading the latter to their starting point, that is to say for displacing the whole formed by the saws carrier and the bar 6' in a reverse direction to that of the arrow $f'$.

For assuring the automatic operation of the machine it is necessary to provide an arrangement by means of which at any moment the saws may conveniently press upon the piece to be sawed. It is necessary besides to provide an arrangement assuring automatically at the ends of the stroke the engagement or the disengagement of the drive movement of the saws carrier.

Convenient pressure is exercised upon the saws by any appropriate arrangement for example as indicated in the drawings by means of a wheel having a channel 11, in the channel of which engages a rib guide 10 provided upon the upper face of the saws carrier, the axis of the said wheel being weighted.

The automatic engagement and disengagement at the ends of the stroke are obtained by means of the following arrangement:

Upon the motor spindle 3 is mounted a free socket 12 upon which is fixed a chain pinion 13. Another pinion 14 is mounted upon the spindle 9, these two pinions being connected by a chain 15. The socket 12 presents at one of its extremities teeth cut in such manner as to form a catch. Corresponding teeth are cut upon another socket 16 capable of sliding freely upon the spindle 3 but drawn by this spindle in its rotary movement by means of a key or of any other similar device. The socket 16 presents two collars 17 leaving between them a channel in which engages a fork carried by an angle lever 18 pivoting upon the axis 19.

It will be understood readily that when the socket 16 is in the position indicated in plain lines in Fig. 2, this socket turns constantly, drawn by the spindle 3. It draws in its movement the socket 12 and consequently the pinion 13 which is solid with it. Thus the pinion 14 turns and causes to turn with it the spindle 9 at the extremity of which is carried the pinion 8 which in its turn produces the displacement of the rack 7 in the direction of the arrow f' (working stroke). If on the contrary the socket 16 is separated from the socket 12 by the play of the angle lever 18, the socket 16 being drawn into the position indicated in dotted lines on Fig. 2, the socket 12 ceases to be drawn and the pinion 13 can turn free. The members find themselves in this position during the return ineffective stroke of the saws (the reverse direction of the arrow f'), the saws being thus displaced as has been shown under the action of the sawed piece itself.

The displacements of the socket 16 are obtained automatically by means of the following arrangement:

Upon the spindle 9 is mounted a screw 20 turning with the said spindle but capable of sliding upon it (a key being for example as indicated in Fig. 2 mounted for this purpose between the spindle and the screw). On the other side upon the same spindle 9 is mounted a screw nut 21 which can turn free upon the said spindle but that a collar 22 prevents its displacement the length of this spindle. An abutment 23 is disposed at a convenient point upon the spindle 9.

The operation of this arrangement is the following:

When the spindle 9 turns it draws with it in its rotary movement the screw 20 which being displaced upon the length of the said spindle screws in its screw nut 21 (or unscrews according to the direction of movement). When the screw 20 in its displacement comes to contact with or contact against the collar 23 as indicated in Fig. 2 or against the end of the screw nut 21, the screw nut is rendered solid with the screw. At this moment the screw 20 tending to continue its movement draws in this movement the screw nut which turns to a certain extent either to the right or to the left by reference to Fig. 1. The screw nut 21 carries a member 24 to which is articulated a rod 25 whose other extremity is articulated upon one of the arms of the angle lever 18. The rotation of the screw nut 21 in one direction or the other has thus for its purpose to cause the angle lever 18 to pivot about its axis 19 and consequently to displace the socket 16 the length of the spindle 3. This displacement of the socket 16 has for its effect as has before been stated either to put into engagement the teeth of the socket 16 with those of the socket 12 (driving position of the saws carrier) or to disengage the teeth (the idle return position of the saws). A counterweight 26 mounted at the extremity of a rod fixed to the screw nut 21 facilitates the displacement of the said screw nut at the ends of the stroke, this counterweight coming into position either as indicated upon Fig. 1 or into a symmetrical position by reference to the vertical axis.

It is to be understood that the system of engagement of the sockets 12 and 16 can be replaced by any other coupling arrangement giving the same results.

The mechanism constituted by the screw 20 and its screw nut 21 with the connected members permitting of obtaining movements which have just been described, can besides be applied to any other machine for an analogous purpose. These applications of the said mechanism are comprised within the present invention.

I claim:

1. A sawing machine for the simultaneous production of a number of pieces in a sawing operation, consisting of a number of saws, a carrier within which the said saws are mounted for simultaneous reciprocation in the same direction, and means for carrying the work piece, and continuously rotating it in a direction opposite to that of the effective stroke of the saws, substantially as described.

2. A sawing machine for the simultaneous production of a number of pieces in a sawing operation, consisting of a number of saws, a carrier within which the said saws are mounted for simultaneous reciprocation in the same direction, means for carrying the work piece and continuously rotating it in a direction opposite to that of the effective stroke of the saws, means for effecting the operative stroke of the saws, and for disengaging the operating mechanism at the end of the operative stroke, and means operated from the continuously rotating work piece for effecting the idle return movement of the saws, substantially as described.

3. A sawing machine for the simultaneous production of a number of pieces in a sawing operation, consisting of a number of saws, a carrier within which the said saws are mounted for simultaneous reciprocation in the same direction, means for imparting to the saws carrier a rectilinear movement, comprising a rack and pinion device, means to cause the arrestment of the movement of the pinion for the idle or return stroke, and means for carrying the work piece and for rotating it in a direction opposite to that of the effective stroke of the saws, substantially as described.

4. A sawing machine for the simultaneous production of a number of pieces in a sawing operation, consisting of a number of saws, a carrier within which the said saws are mounted for simultaneous reciprocation in the same direction, mechanism for causing the operative stroke of the saws, and means comprising a movable screw for effecting the engagement and disengagement of the mechanism for causing the operative stroke of the saws, substantially as described.

FRÉDÉRIC BECK.

Witnesses:
 JOHN F. SIMONS,
 MIGUEL ZEROLO.